United States Patent
Klink et al.

(10) Patent No.: US 10,961,959 B2
(45) Date of Patent: Mar. 30, 2021

(54) FILTER SYSTEM WITH A FILTER ELEMENT

(71) Applicant: MANN+HUMMEL GmbH, Ludwigsburg (DE)

(72) Inventors: Christoph Klink, Moeglingen (DE); Christine Oprisch, Oberriexingen (DE); Matthias Alex, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 300 days.

(21) Appl. No.: 15/982,755

(22) Filed: May 17, 2018

(65) Prior Publication Data

US 2018/0333665 A1 Nov. 22, 2018

(30) Foreign Application Priority Data

May 18, 2017 (DE) .................. 10 2017 004 777

(51) Int. Cl.
| | | |
|---|---|---|
| *F02M 37/32* | (2019.01) | |
| *B01D 29/21* | (2006.01) | |
| *B01D 29/92* | (2006.01) | |
| *B01D 35/157* | (2006.01) | |
| *B01D 35/30* | (2006.01) | |
| *F02M 37/00* | (2006.01) | |
| *F02M 37/22* | (2019.01) | |
| *F02M 37/54* | (2019.01) | |
| *B01D 27/08* | (2006.01) | |
| *F02M 25/022* | (2006.01) | |

(52) U.S. Cl.
CPC .............. *F02M 37/32* (2019.01); *B01D 29/21* (2013.01); *B01D 29/216* (2013.01); *B01D 29/92* (2013.01); *B01D 35/157* (2013.01); *B01D 35/30* (2013.01); *F02M 37/0041* (2013.01); *F02M 37/22* (2013.01); *F02M 37/54* (2019.01)

(58) Field of Classification Search
CPC .............. B01D 35/157; B01D 35/1576; F02M 37/0041
See application file for complete search history.

(56) References Cited

U.S. PATENT DOCUMENTS

| | | | | |
|---|---|---|---|---|
| 5,803,024 A * | 9/1998 | Brown | .................... | B01D 27/06 123/41.15 |
| 6,969,461 B2 * | 11/2005 | Beard | .................. | B01D 27/005 210/203 |
| 7,160,451 B2 * | 1/2007 | Hacker | .................. | B01D 27/06 184/6.24 |

(Continued)

FOREIGN PATENT DOCUMENTS

DE 3715582 A1 11/1988

*Primary Examiner* — Benjamin M Kurtz
(74) *Attorney, Agent, or Firm* — James Hasselbeck

(57) ABSTRACT

A filter system for filtering a fluid has at least one filter housing with a first housing part and a second housing part. The filter housing has at least one inlet and at least one outlet for the fluid. A fluid path extends between the at least one inlet and the at least one outlet. At least one filter element is arranged in the at least one filter housing in the fluid path. At least one damper element is provided that is completely or partially filled with the fluid at least after an initial filling. The at least one damper element is provided with a volume that, at least in operation of the filter system, is filled completely or partially with the fluid. The volume is separated from the fluid path.

12 Claims, 5 Drawing Sheets

(56) References Cited

U.S. PATENT DOCUMENTS

| | | | |
|---|---|---|---|
| 2002/0195380 A1* | 12/2002 | Martin | B01D 37/025 210/109 |
| 2009/0320420 A1* | 12/2009 | Rieger | F02M 35/1216 55/391 |
| 2010/0176766 A1 | 7/2010 | Brandner et al. | |

* cited by examiner

5670

FILTER SYSTEM WITH A FILTER ELEMENT

TECHNICAL FIELD

The invention concerns a filter system for filtering a fluid with a filter element.

BACKGROUND

DE 37 15 582 A1 discloses an air filter system with a damper element by means of which noises can be damped that may occur in pulsating fuel flows. The damper element operates in the manner of a swirl plate that, by a plurality of flow channels, divides, diverts, and swirls the pulsating fuel flow for oscillation reduction.

SUMMARY OF THE INVENTION

It is object of the invention to provide a filter system, in particular a fuel filter system, that reduces a pulsation in fluid flows in an improved way.

The aforementioned object is solved with a filter system for filtering a fluid, comprising at least one filter housing, which filter housing comprises at least one inlet and one outlet for the fluid, a fluid path that extends between the at least one inlet and the at least one outlet, at least one filter element, and at least one damper element that is provided completely or partially filled with fluid at least after an initial filling, wherein the damper element comprises a volume that is completely or partially filled with the fluid at least in operation and that is separated from the fluid path.

Beneficial embodiments and advantages of the invention result from the further claims, the description, and the drawing.

A filter system for filtering a fluid, in particular a fuel filter system, is proposed. The filter system comprises at least one filter housing, with a first housing part and a second housing part, wherein the filter housing comprises at least one inlet and one outlet for the fluid. The filter system comprises moreover a fluid path that extends between the at least one inlet and the at least one outlet. The filter system comprises moreover at least one filter element and at least one damper element that, at least after an initial filling, is completely or partially filled with fluid, wherein the at least one damper element comprises a volume that, at least in operation, is completely or partially filled with the fluid and that is separated from the fluid path.

The term "separated from the fluid path" is to be understood such that the filled volume represents a dead volume which, when starting operation of the filter system, is filled with fluid, in particular filled one time with fluid, and after the volume has been filled is no longer flowed through. The fluid can be a gas or a liquid. The damper element can be filled with the fluid or with a mixture of liquid and gas, in particular air. For example, the dead volume can be filled partially or completely with liquid. A beneficial ratio of gas and liquid in the damper element results from the conditions of pressure and temperature occurring in the filter system as well as the material properties of the participating materials. For example, the volume can be filled with the same fluid which is subjected to pressure pulsations.

When used in a motor vehicle, the filter system can be used for filtering the fuel. Also, a use for filtering water is possible, for example, water which is to be injected into the motor. The filter system can also be used for filtering oil.

The fluid path can extend through the damper element wherein the fluid in the fluid path is spatially separated from the dead volume. Moreover, a plurality of dead volumes can be provided.

Beneficially, the invention enables the integration of a pulsation damper into a filter housing. No additional adaptations of conduits for the fluid guiding action are required. Advantageously no separation of the fluids in the filter element and in the damper element is necessary because no separate damping fluid must be employed but the gas that is initially contained in the damper element and/or the liquid that is initially contained in the damper element as well as the fluid contained in the filter element are employed. This enables advantageously a raw-side coupling of filter element and damper element. Alternatively, a clean-side coupling can be provided also. After a one-time initial filling upon starting operation of the filter system, the at least one damping element is completely or partially filled with fluid.

The first housing part can be, for example, a housing pot and the second housing part a housing cover that seal-tightly closes off the housing pot. Expediently, the inlet is provided in one of the housing parts and the outlet in the other one of the housing parts. Often, outlet and inlet can both be provided at one of the housing parts, for example, both at the housing cover or both at the housing pot. In this way, in vertically employed filter systems the connectors can be expediently arranged at one of the housing parts, for example, at the housing cover in case of filter systems that are not intended to be opened and at the housing pot in case of filter systems that are intended to be opened.

According to a beneficial embodiment, the at least one filter element and the at least one damper element can be arranged one after the other relative to the fluid path. In this context, the damper element can be arranged functionally upstream of the filter element or can be arranged downstream thereof. Beneficially, the damper element tightly neighbors the filter element. Alternatively, the damper element can be connected fixedly to the filter element. The damper element can be arranged in its own housing and, for example, adjoin with bottom or cover an end disk of the filter element. Optionally, bottom or cover of the damper element can form the corresponding end disk of the filter element.

According to a beneficial embodiment, the fluid path can be guided at least with sections thereof through the volume. The volume can surround at least sections of the fluid path in the damper element. Preferably, the volume can be concentrically arranged about the fluid path. Alternatively, the fluid path can be guided, at least with sections thereof, adjacent to the volume of the damper element.

According to a beneficial embodiment, the damper element can be embodied in the manner of a Helmholtz resonator. A Helmholtz resonator is comprised generally of an oscillation-capable fluid in a channel, in particular in a resonator channel, also referred to as resonator neck, and a fluid volume that is coupled thereto. Advantageously, inter alia by the configuration of the volume and the employed fluid, the resonance frequency can be influenced. Usually, the damping action begins advantageously above the resonance frequency of the resonator. An adaptation for various dimensions of the filter housing can be realized with reasonable expenditure, respectively.

According to a beneficial embodiment, in a section of the fluid path a resonator channel can be provided which extends from the fluid path into the volume of the damper element. In this context, arrangement, diameter, and length of the resonator channel can be embodied to match the desired resonance frequency. The fluid path can be guided through the damper element or can be guided past the damper element. Optionally, at least one fluid path section can be guided through the damper element and at least one other fluid path section can be guided past the damper element and, from both fluid path sections, a resonator channel can extend into the damper element. Optionally, a plurality of damper elements can be provided instead of one damper element in this case.

According to a beneficial embodiment, the damper element can comprise a housing, in particular with bottom, wall, and cover. Advantageously, the housing of the damper element can be cylindrically embodied and reliably separate a clean side from a raw side of the filter element. The housing can be easily produced with regard to construction and, in particular, can be embodied for a plastics injection molding process so as to be easily mold-removable. Optionally, the housing of the damper element can be, with sections thereof, a component of the filter housing.

According to an expedient embodiment, the damper element may comprise a venting device toward the filter element. Alternatively, the damper element can comprise a venting device toward the clean side of the filter element or toward the raw side into the housing. Expediently, the volume of the damper element, depending on the functional use of the damper element with raw fluid or clean fluid, can be in communication with the raw side or the clean side of the filter element so that, upon filling of the volume of the damper element, the fluid accordingly can come into contact only with the filtered or unfiltered fluid, for example, the housing of the damper element can comprise a venting device in the form of a bore. Optionally, a venting device can also be omitted.

According to a beneficial embodiment, the fluid path in the damper element can extend in a tube. The tube can extend through the damper element from a bottom of the damper element neighboring the filter element to the second housing part. Expediently, the tube can extend away straight from the adjoining filter element. In particular, the resonator channel can extend through the wall of the tube for transferring the fluid into the damper element. The geometry of the resonator channel can be easily adapted for setting the resonance frequency of the damper element.

According to a beneficial embodiment, the resonator channel, for transfer of the fluid into the damper element, can project past a wall of the tube into the surrounding volume of the damper element. Optionally, the resonator channel can project from the housing of the damper element, e.g., wall, bottom, or cover of the damper element, into the damper element. The geometry of the resonator channel can be easily adapted for setting the resonance frequency of the damper element.

According to a beneficial embodiment, the tube can comprise a circumferentially extending collar which forms a cover or bottom of a housing of the damper element. The construction is simple and can be fixedly connected with the housing wall of the damper element easily during production or assembly.

According to a beneficial embodiment, the filter element can comprise a closed filter body with an inner hollow space. Advantageous is, for example, a cylindrical round filter with star-folded filter body. Other cross sections of the filter element are optionally possible. The filter body can be flowed through from the exterior to the interior so that the inner hollow space forms the clean side of the filter element. Alternatively, a flow from the interior to the exterior is possible also so that the inner hollow space forms the raw side of the filter element.

According to a beneficial embodiment, the fluid channel, preferably the tube in which the fluid channel extends with sections thereof, can adjoin the hollow space of the filter body. This provides for a compact arrangement, for example, a cylindrical arrangement in the filter housing.

According to a beneficial embodiment, the damper element can be in fluid communication with a clean side of the filter element. According to a beneficial alternative embodiment, the damper element can be in fluid communication with the raw side of the filter element. The design of the filter system can be easily adapted to given general conditions.

According to a beneficial embodiment, a resonator channel for transfer of the fluid into the damper element can extend into the volume from a housing of the damper element adjoining the fluid path. Damping properties can be adapted based on given geometries and specifications.

According to a beneficial embodiment, a region of a housing of the damper element can be integrated into an end disk of the filter element. In particular, a region of a housing of the damper element can form an end disk of the filter element. This enables an advantageous compact embodiment of the filter system.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to meaningful further combinations.

DESCRIPTION OF PREFERRED EMBODIMENTS

Figure 1:
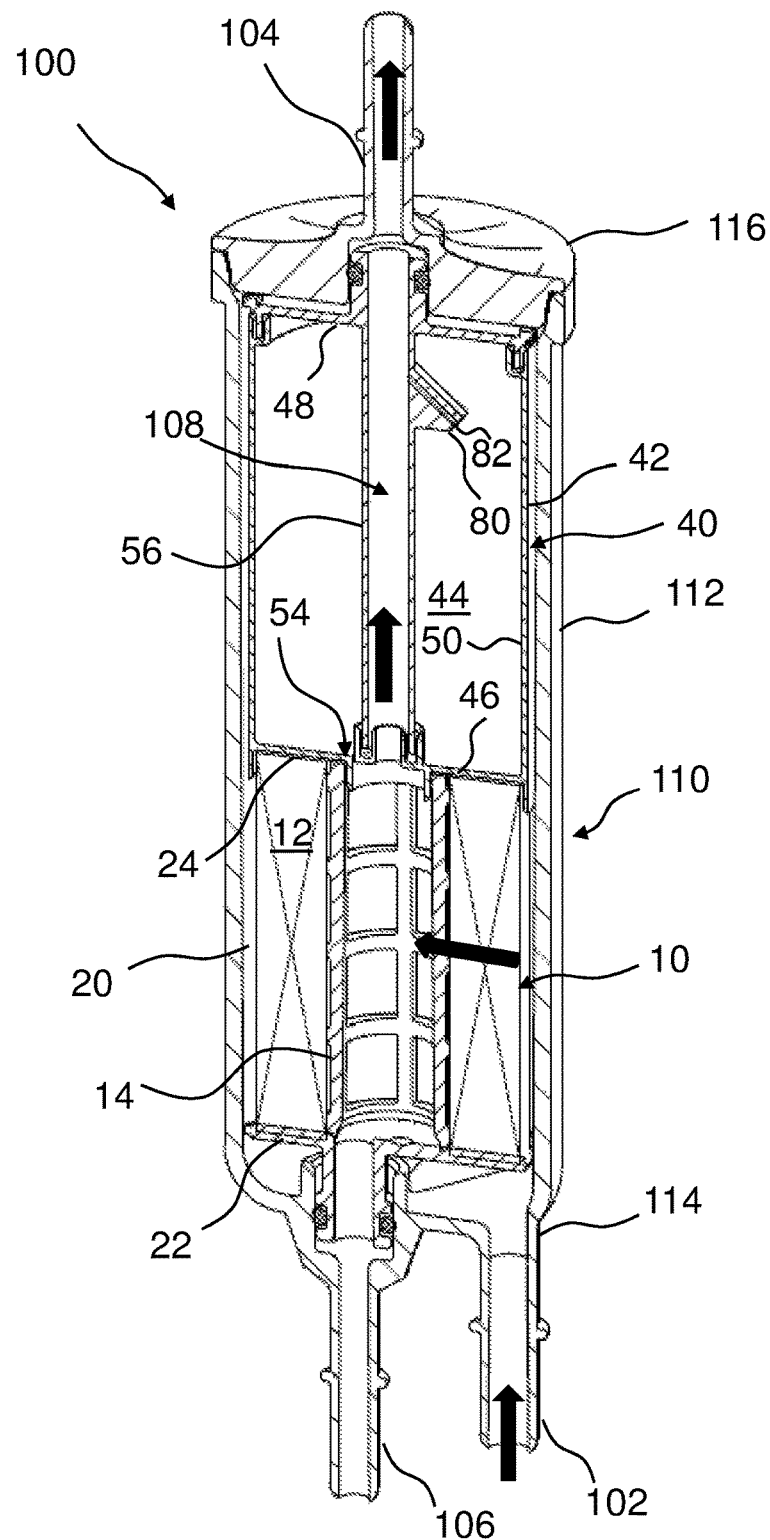
FIG. 1 shows a longitudinal section of the filter system with a cylindrical filter housing according to an embodiment of the invention with a filter element and a damper element adjoining along a fluid path.

In the Figures, same or same-type components are identified with same reference characters. The Figures show only examples and are not be understood as limiting.

Figure 2:
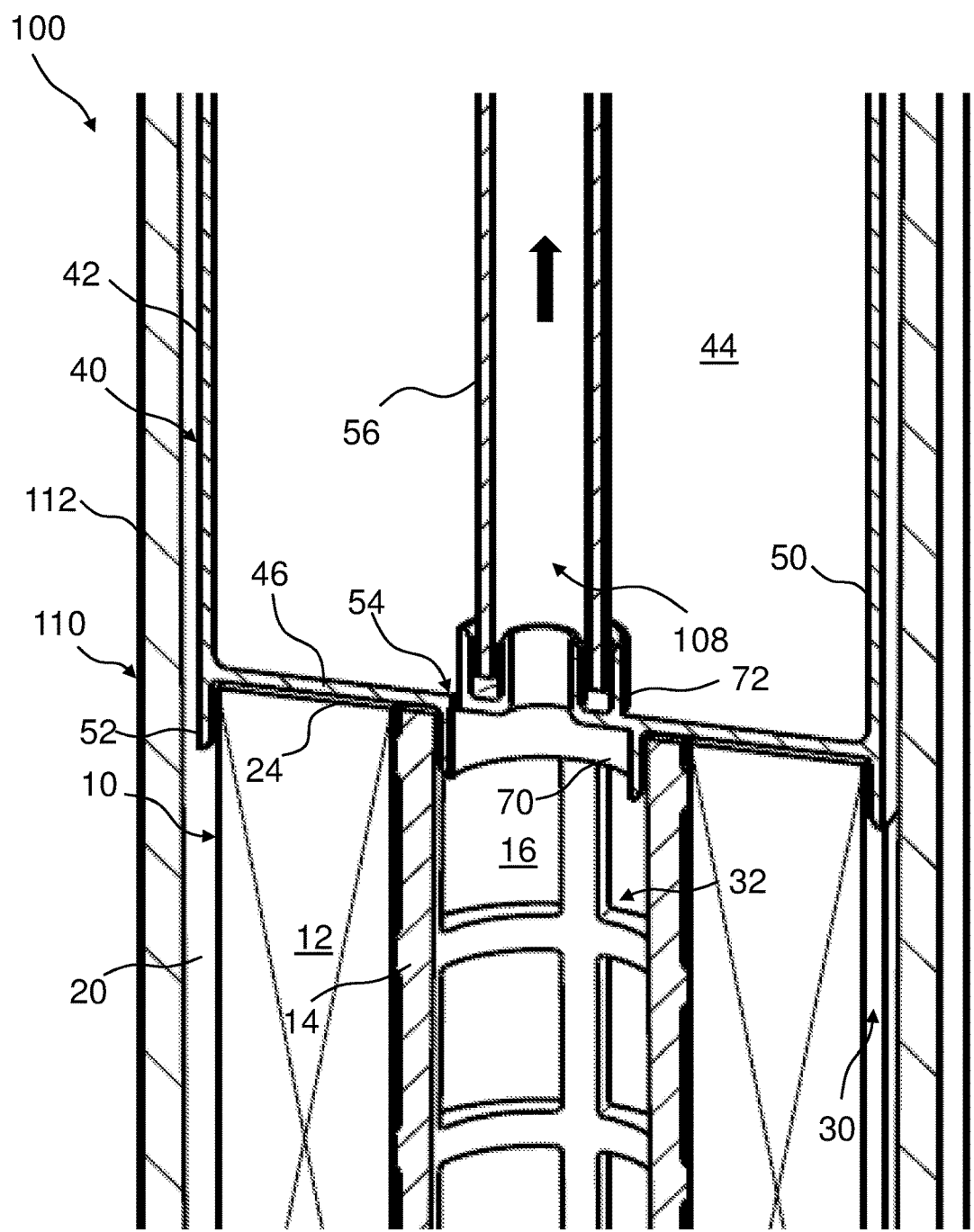
FIG. 2 shows in longitudinal section a detail of the filter system of FIG. 1 in the region of the filter element.
Figure 3:
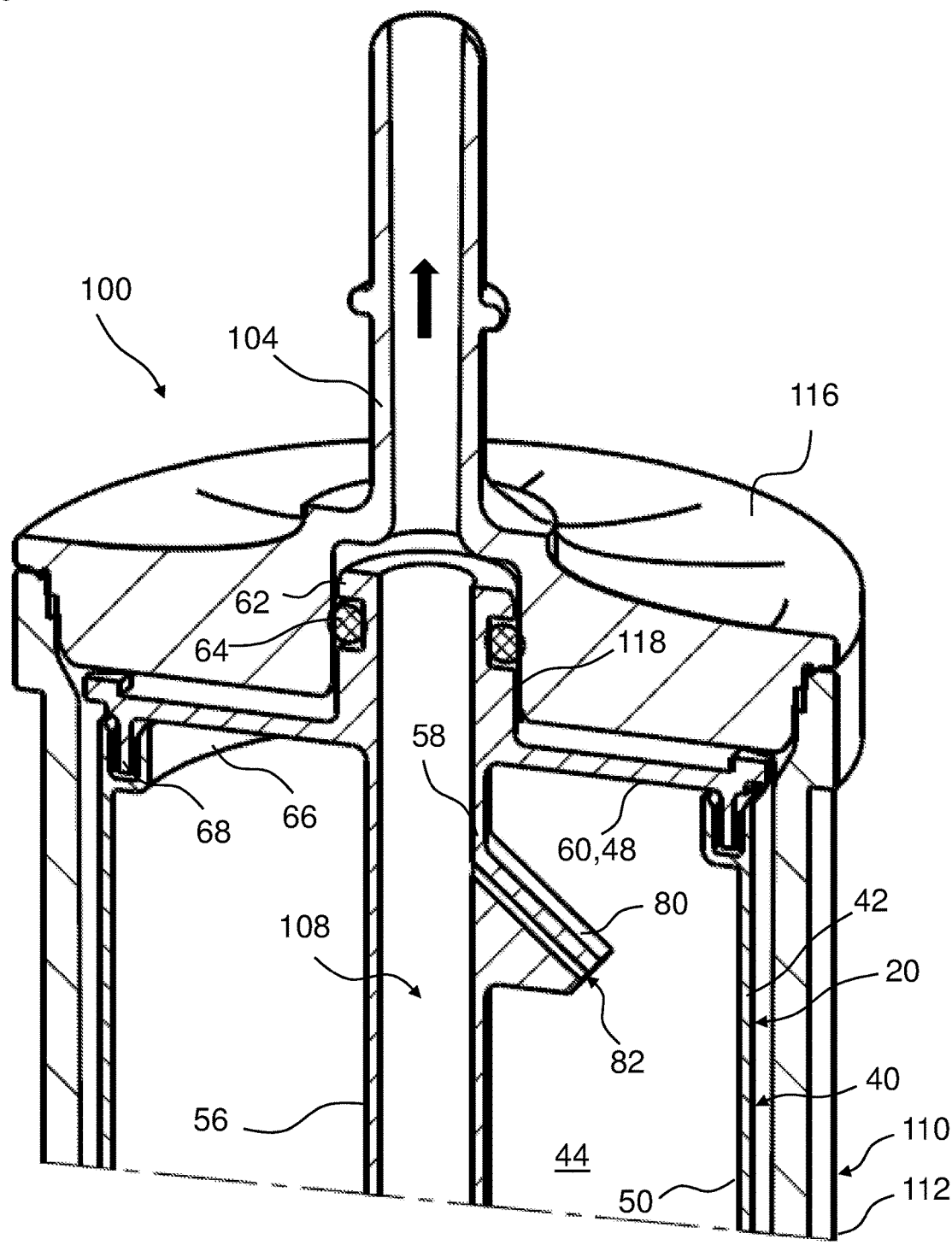
FIG. 3 shows in longitudinal section a detail of the filter system of FIG. 1 in the region of the damper element.

FIG. 1 shows in a longitudinal section a filter system 100 for filtering a fluid according to an embodiment of the invention. The filter system 100 can be in particular a fuel filter system in which a fuel for an injection device of an internal combustion engine is filtered. Alternatively, the filter system 100 can be provided as a water filter system for the injection of water into an internal combustion engine. FIGS. 2 and 3 show details of the longitudinal section of the filter system 100 in the region of a transition between a filter element 10 and a damper element 40 (FIG. 2) and in the region of the damper element 40 (FIG. 3).

In the filter housing 110, a fluid path 108 extends between the inlet 102 and the outlet 104. The flow of the fluid along the fluid path 108 between inlet 102 and outlet 104 for the fluid is indicated with fat arrows, not identified specifically.

The inlet 102 in this embodiment is arranged eccentrically in a bottom region 114 of a first housing part 112 and the outlet 104 centrally in a second housing part 116. In the bottom region 114 of the filter housing 110, optionally a fluid return 106 can be arranged. The first housing part 112 is embodied, for example, as a housing pot and the second housing part 116, for example, as a housing cover. The two housing parts 112, 116 can be connected fixedly to each other, for example, fused or glued.

The fluid path 108 extends in the filter housing 110 through a filter element 10 and a damper element 40 so that the damper element 40 is arranged at the clean side relative to the filter element 10.

The filter element 10 comprises a filter body 12, which is flowed through radially and, for example, is cylindrical, in a filter housing 110 which comprises an inlet 102 and an outlet 104 for the fluid. The filter body 12 is arranged on a radially inwardly positioned support tube 14 and is, for example, star-folded and closed so that it comprises an annular cross section. Optionally, other cross sections are possible. Optionally, the filter body 12 can also be wound instead of folded. The filter body 12 separates raw side 30 from clean side 32 of the filter element 10.

A hollow space 16 is formed in the interior of the filter body 12. A section of the fluid path 108 extends in the hollow space 16 in the interior of the filter body 12. A further section of the fluid path 108 extends through the adjoining damper element 40.

At both end faces of the filter body 12, an end disk 22, 24 is arranged, respectively. In the bottom end disk 22 in the bottom region 114 of the filter housing 110, an opening is provided, not identified specifically, which connects the hollow space 16 with the fluid return 106. In the oppositely positioned end disk 24, an opening is provided which connects the hollow space 16 with the fluid path 108 in the tube 56, which tube is extending in the damper element 40 and adjoins the upper end disk 24.

The filter element 10 and the adjoining damper element 40 are spaced apart by a gap 20 relative to the filter housing 110. For example, the raw-side fluid is within the gap 20 and flows through the filter body 12 into the inner hollow space 16 at the clean side 32 of the filter body 12 and from there into the tube 56 in the damper element 40. Optionally, the flow direction through the filter element 10 can also be reverse so that the inner hollow space 16 is arranged at the raw side and the gap 20 at the clean side, relative to the filter body 12 of the filter element 10.

The damper element 40 is hermetically sealed relative to the gap 20 and can be loaded in its interior only with fluid from the hollow space 16 of the filter body 12. The damper element 40 comprises a housing 42 that comprises a bottom 46, seated on the end disk 24 of the filter element 10, and that engages with a circumferentially extending projection 52 of the housing wall 50 the filter element 10 at its end face and with a socket 70 engages in the support tube 14. A receptacle 72 projecting into the damper element 40 is arranged above the socket 70 and receives the tube 56. The tube 56 is inserted, for example, into the U-shaped receptacle 72. Optionally, the tube 56 can be formed as one piece together with the bottom 46.

Optionally, the gap 20 can end at the damper element 40. In this case, the outer wall 50 of the housing 42 is integrated into the corresponding housing part of the filter housing 110.

The damper element 40 comprises in the interior a volume 44 that, at least in operation, is filled with the fluid and that is separated from the fluid path 108 in the damper element 40 by the tube wall 58 of the tube 56. The tube 56 is surrounded by the volume 44. The fluid can be a liquid so that the volume 44 can be completely or partially filled with liquid.

The damper element 40 comprises in this example an optional venting device 54 toward the filter element 10. Depending on the installation position of the filter system 100, different embodiments can be beneficial. The venting device 54 can be a bore adjacent to the socket 70; also, a venting pipe as a venting device 54 can be provided whose opening extends to the housing wall 42 of the damper element 40. This configuration is beneficial for horizontal installation of the filter system 100 and enables a practically complete filling of the volume 44 with the fluid from the hollow space 16 of the filter element 10.

The tube 56 projects with its free end 62 into a receptacle 118 of the second housing part 116 and is sealed by means of a radially outwardly arranged sealing ring 64 relative to the region of the second housing part 116 that is in communication with the gap 20.

The tube 56 comprises a circumferentially extending disk-shaped collar 60 which forms the cover 48 of the housing 42 of the damper element 40. The cover 48 is received with an axially projecting collar 68 in a receptacle 66 of the housing wall 50 and is seal-tightly connected therewith, for example, fused, glued or the like. Optionally, the cover 48 can be formed together with the housing wall 50 as one piece.

The damper element 40 is preferably embodied in the manner of a Helmholtz resonator. A Helmholtz resonator is comprised generally of an oscillation-capable fluid in the resonator neck, which is formed by a resonator channel 82 in the damper element 40, and a fluid volume coupled thereto. The oscillation-capable fluid is preferably contained in the resonator channel 82 provided in a section of the fluid path 108 in the damper element 40, which extends from the fluid path 108 into the volume 44 of the damper element 40, extends through a wall 58 of the tube 56, and projects past the wall 58 of the tube 56 into the surrounding volume 44 of the damper element 40. By arrangement, length, and diameter of the resonator channel 82, the volume 44, and the employed fluid, the resonance frequency f of the damper element 40 can be predetermined. When the fluid is pulsating in the filter system 100, the fluid in the resonator channel 82 oscillates and couples in to the fluid in the volume 44. At one resonance frequency, the damper element 40 absorbs strongly the oscillations in the fluid so that they can no longer propagate and produce disturbances in components connected thereto.

The resonator channel 82 is formed in a projection 80 which is projecting away from the wall 58 of the tube 56 into the volume 44. The projection 80 is formed like a nose with a ramp relative to the longitudinal axis of the tube 56. The slant of the ramp may be adjusted in accordance with the flow direction of the fluid in the tube 56. In the illustrated embodiment, the resonator channel 82 is pointing at a slant opposite to the flow direction. Alternatively, other configurations are possible also.

The volume 44 is preferably filled once in operation of the filter system 100 through the channel 82 with the fluid that is subjected to the pressure pulsations. The fluid remains subsequently in the volume 44. For example, the fluid is fuel or water. Optionally, the volume 44, instead of being filled only with the fluid that is filtered by the filter element, can be filled also with a mixture of liquid and gas, in particular air.

Advantageously, the filter system 100 combines the function of the filtration with the damping action of pressure pulsations in the fluid within the same housing 110.

Figure 4:
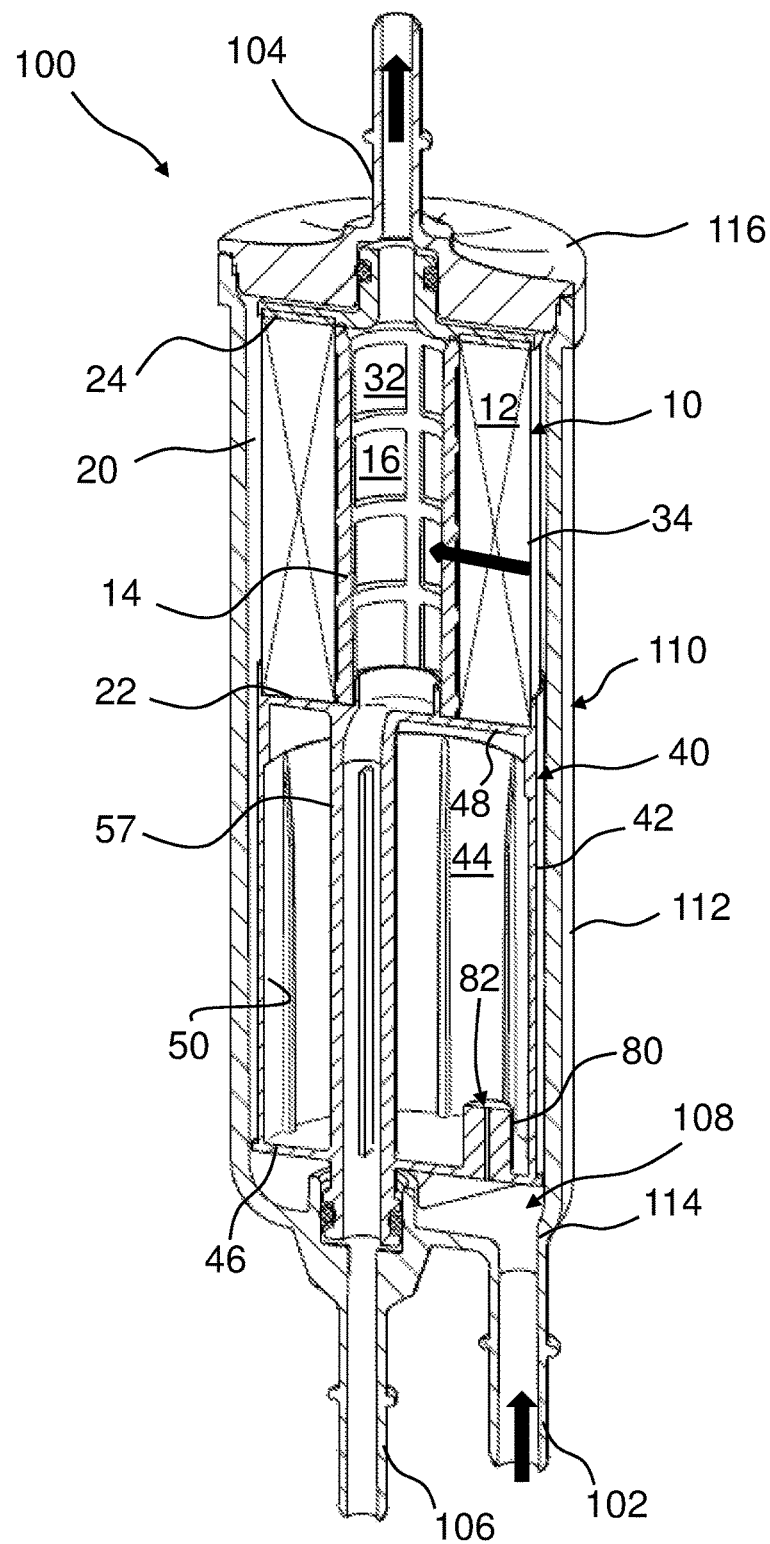
FIG. 4 shows a longitudinal section of a filter system with a cylindrical filter housing according to a further embodiment of the invention with a filter element and a damper element adjoining along a fluid path.

FIG. 4 shows a further embodiment of a filter system 100 in longitudinal section. In the filter housing 110 of the filter system 100, a fluid path 108 extends between the inlet 102 and the outlet 104. The flow of the fluid along the fluid path 108 between inlet 102 and outlet 104 for the fluid is indicated with fat arrows not identified specifically.

The inlet 102 in this embodiment is arranged eccentrically in a bottom region 114 of a first housing part 112 and the outlet 104 centrally in a second housing part 116. In the bottom region 114 of the filter housing 110, optionally a fluid return 106 can be arranged. The first housing part 112 is embodied, for example, as a housing pot and the second part 116, for example, as a housing cover. The two housing parts 112, 116 can be connected fixedly to each other, for example fused or glued.

The fluid path 108 extends in the filter housing 110 through a damper element 40 and downstream thereof through a filter element 10 so that the damper element 40 is arranged at the raw side relative to the filter element 10.

The filter element 10 comprises a filter body 12 that is radially flowed through and, for example, is cylindrical. The filter body 12 is arranged on a radially inwardly positioned support tube 14 and, for example, is star-folded and closed so that it has an annular cross section. Optionally, other cross sections are possible. Optionally, the filter body 12 can also be wound instead of folded. The filter body 12 separates raw side 30 from clean side 32 of the filter element 10.

In the interior of the filter body 12, a hollow space 16 is embodied which forms a section of the fluid path 108. Upstream thereof, a section of the fluid path 108 is provided which extends from the inlet 102 to the filter element 10 through a gap 20 adjacent to the damper element 40 arranged at the raw side. Optionally, a tube conduit can also be guided through the damper element 40.

At both end faces of the filter body 12, an end disk 22, 24 is arranged, respectively. In the bottom end disk 22 adjacent to the damper element 40 in the bottom region 114 of the filter housing 110, an eccentric opening, not specifically identified, is provided which connects the hollow space 16 by a tube 57 with the fluid return 106. The tube 57 extends hermetically sealed relative to the damper volume 44 from the hollow space 16 through the damper element 42 to the return 106. The end disk 22 forms at the same time the cover 48 of the damper element 40.

In the oppositely positioned end disk 44 an opening is provided which connects the hollow space 16 with the outlet 104.

The damper element 40 and the adjoining filter element 10 are spaced apart by a gap 20 from the filter housing 110. For example, the raw-side fluid is located in the gap 20 and flows past the damper element 40 and through the filter body 12 into the inner hollow space 16 at the clean side 32 of the filter body 12, and from there to the outlet 104.

The damper element 40 comprises a housing 42 that comprises a bottom 46, a cover 48, and a wall 50. The tube 57 extends through the cover 48, which forms one end disk 22 of the filter element 10, and through the bottom 46 to the return 106. The wall 50 can be reinforced in the interior by ribs that are not specifically identified.

The damper element 40 comprises in the interior a volume 44 that, at least in operation, is filled with the fluid and is separated from the fluid path 108 in the damper element 40 by the housing 42. The fluid can be a liquid so that the volume 44 can be filled completely or partially with liquid.

Through the bottom 46 of the damper element 40, a resonator channel 82 is extending which is formed in a pin 80 which is oriented away from the bottom 46 into the volume 44. The pin 80 and the resonator channel 82 are arranged parallel to the longitudinal axis of the damper element 40. Optionally, a slanted position of the resonator channel 82 can be provided.

The volume 44 of the damper element 40 is filled completely or partially with raw fluid upon initial filling.

Optionally, the gap 20 at the damper element 40 can be omitted and the raw fluid can be guided past the damper element 40 or through it, for example, with a tube conduit, to the filter element 10. In this case, the outer wall 50 of the housing 42 is integrated into the corresponding housing part of the filter housing 110.

Figure 5:
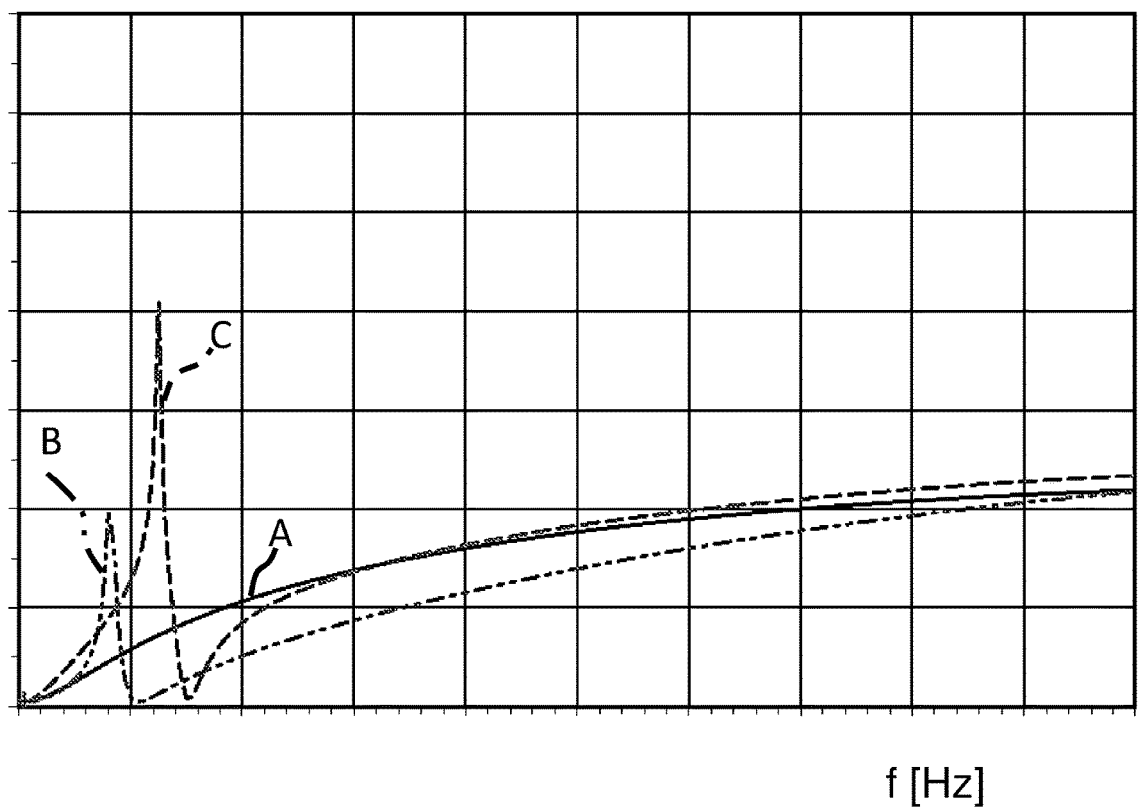
FIG. 5 shows characteristic lines of the frequency-dependent damping in a filter system without damper element and in a filter system according to the invention with different volumes of a damper element.

FIG. 5 shows characteristic lines of the frequency-dependent damping d in a filter system without damper element (characteristic line A) and in a filter system 100 according to the invention with different volumes 44 of the damper element 40 (characteristic lines B, C), as illustrated in FIGS. 1 to 3.

In case of the solid characteristic line A, the damping action d rises without contour with increasing frequency f. Characteristic line B shows a resonance with strong damping action at a low frequency. Characteristic line C shows a resonance with stronger damping action at a higher frequency. Characteristic line C is based on a greater volume 44 of the damper element 40 in comparison to characteristic line B. Advantageously, frequencies below 200 Hz, preferably below 100 Hz, in particular below 50 Hz, can be effectively damped.

While specific embodiments of the invention have been shown and described in detail to illustrate the inventive principles, it will be understood that the invention may be embodied otherwise without departing from such principles.

What is claimed is:
1. A filter system for filtering a fluid, the filter system comprising:
    a filter housing comprising
        a first housing part and
        a second housing part;
        wherein the first and second housing parts connect together to enclose an interior chamber of the filter housing;
    the filter housing comprising
        at least one inlet and
        at least one outlet for the fluid;
    a fluid path extending between the at least one inlet and the at least one outlet;
    a filter element arranged in the interior chamber of the filter housing in the fluid path;
    a damper element, arranged in the interior chamber of the filter housing, the damper element comprising:
        an outer wall radially enclosing an internal damper volume of the damper element;
        a tubular pipe elongated in an axial direction and arranged in the internal damper volume, the tubular pipe extending from a first axial end wall of the damper element, through the internal damper volume and to an opposite second axial end wall of the of the damper element, the tubular pipe enclosing a portion of the fluid path extending through the internal damper volume;

wherein the damper element is completely or partially filled with the fluid at least after an initial filling;

wherein the damper element further comprises a venting device configured to vent toward the filter element, the venting device having a bore extending through the first axial end wall of the damper element, and arranged between a radially outer wall of the tubular pipe and a radially inner flow face of the filter element.

2. The filter system according to claim 1, wherein the filter element and the damper element are arranged axially one after the other relative to the axial direction of the tubular pipe.

3. The filter system according to claim 1, wherein the fluid path is guided at least partially adjacent to the volume of the damper element.

4. The filter system according to claim 1, further comprising
a tubular protrusion arranged on a radially outer wall of the tubular pipe, the tubular protrusion having a resonator channel extending from the fluid path of the tubular pipe to a radially outer end of the tubular protrusion into the internal damper volume;
wherein the fluid path is extending through the tube in the damper element.

5. The filter system according to claim 4, wherein the volume of the damper element surrounds the tube and
wherein the tubular protrusion projects past a wall of the tubular pipe into the internal damper volume of the damper element.

6. The filter system according to claim 4, wherein the tubular pipe comprises a circumferentially extending collar and the collar forms a cover of the damper housing.

7. The filter system according to claim 1, wherein the filter element comprises
a closed filter body comprising an inner hollow space, wherein the tubular pipe adjoins the inner hollow space of the filter body.

8. The filter system according to claim 1, wherein a region of the damper housing of the damper element is integrated into an end disk of the filter element.

9. The filter system according to claim 8, wherein the region of the housing of the damper element forms the end disk of the filter element.

10. The filter system according to claim 1, wherein the fluid is a liquid selected from the group consisting of fuel, water, and oil.

11. The filter system according to claim 4, wherein an axial end of the tubular pipe is received into and engaging into an annular U-shaped receptacle formed on the first axial end wall of the damper element.

12. The filter system according to claim 1, wherein the first axial end wall of the damper element includes a tubular protrusion forming a resonator channel extending through the first axial end wall of the damper element to fluidically communicate with the inlet of the filter housing.

* * * * *